J. G. HODGSON.
RESILIENT TIRE SEATING RIM FOR VEHICLE WHEELS.
APPLICATION FILED MAR. 21, 1910.
996,246.
Patented June 27, 1911.
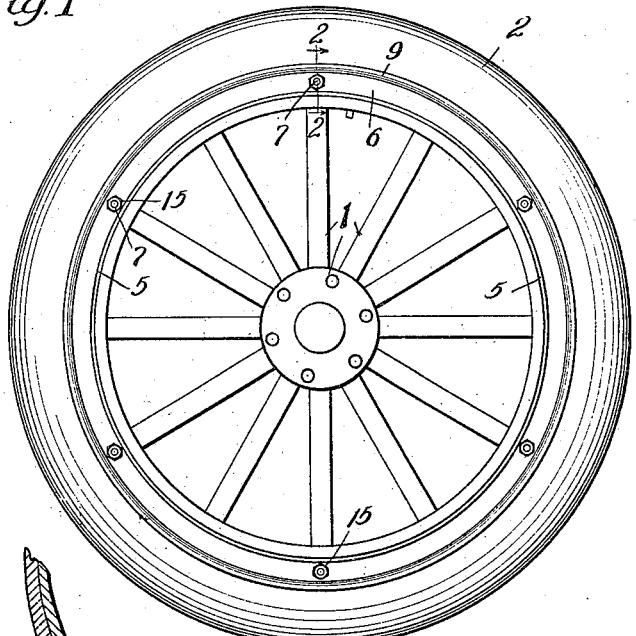
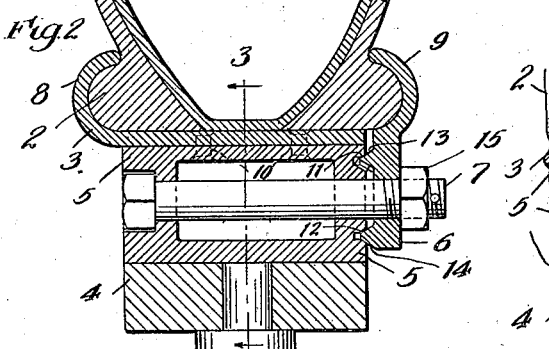
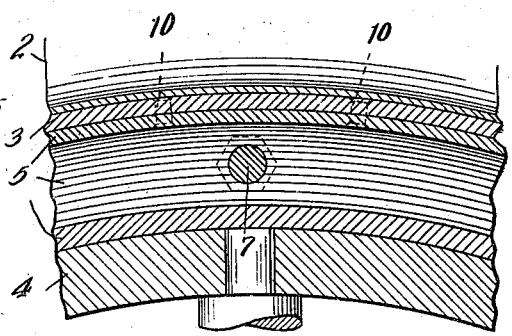
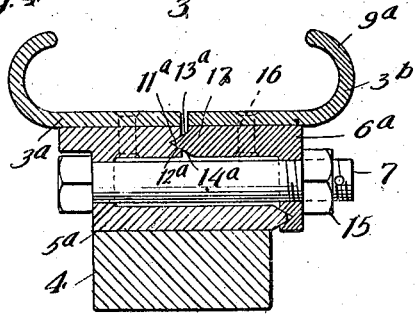
Witnesses:
Inventor
John G. Hodgson
By Munday, Evarts, Adcock & Clarke
Attorneys

UNITED STATES PATENT OFFICE.

JOHN G. HODGSON, OF MAYWOOD, ILLINOIS.

RESILIENT-TIRE-SEATING RIM FOR VEHICLE-WHEELS.

996,246.　　　Specification of Letters Patent.　Patented June 27, 1911.

Application filed March 21, 1910. Serial No. 550,739.

*To all whom it may concern:*

Be it known that I, JOHN G. HODGSON, a citizen of the United States, residing in Maywood, in the county of Cook and State of Illinois, have invented a new and useful Improvement in Resilient-Tire-Seating Rims for Vehicle-Wheels, of which the following is a specification.

This invention relates to improvements in resilient tire seating rims for vehicle wheels.

The object of the invention is to provide a tire seating rim of a strong, simple, efficient and durable construction, which will enable the resilient tire to be quickly removed and replaced, and in which at the same time no outward or bursting strain will be exerted upon the rim, and which will be especially adapted for use upon resilient tires of the clencher type.

The invention consists in the novel construction of parts and devices and in the novel combinations of parts and devices herein shown and described and more particularly specified in the claims.

In the accompanying drawing forming a part of this specification, Figure 1 is a side elevation of a motor car or other vehicle wheel provided with a tire seating rim embodying the invention. Fig. 2 is a cross section on line 2—2 of Fig. 1. Fig. 3 is a partial vertical section on line 3—3 of Fig. 2 and Fig. 4 is a cross sectional view illustrating a modification.

In the drawing, 1 represents a motor car or other vehicle wheel, 2 its resilient tire of any suitable type or construction, preferably a pneumatic tire as shown in the drawing, 3 the tire seating rim, 4 the felly of the wheel, 5 a metal band shrunk upon the felly, 6 the removable ring and 7 the clamp bolts extending through the metal band 5 and removable ring 6.

The tire seating rim 3 is furnished at the inner side of the wheel with a clencher flange 8 of any suitable form, but preferably curved substantially as shown in the drawing to receive the inner edge of the resilient tire 2. The removable ring 6 is provided with a similar flange 9 for engagement with the outer edge of the tire. At the outer edge of the wheel, the tire seating rim 3 is plain or flangeless.

The metal band 5 which is shrunk upon the felly 4 may be of any suitable construction, but is preferably hollow as indicated in the drawing. And the tire seating rim 3 is secured to the metal band 5 by rivets 10.

The tire seating rim 5 and removable ring 6 which carries the clencher flange 9 are furnished with interengaging double cone or double wedge faces 11, 12 and 13, 14, those, 11, 12, on the metal band 5 being preferably of a groove, V or internal form, and those, 13, 14, on the removable ring 6, preferably of a rib or external form, as shown in Fig. 2. Preferably two of these double cone faces 11, 12, 11, 12, are provided on the metal band 5, and the removable ring 6 likewise has two double cone faces 13, 14, 13, 14, as shown in the drawing, thus affording a very strong and secure interengagement and locking together of the band 5 and ring 6 under action of the clamp bolt 7. The clamp bolts 7 are furnished with threaded nuts 15.

In the modification illustrated in Fig. 4, the construction is the same, excepting that the tire seating rim 3$^a$ is of the circumferentially split type, and its removable member 3$^b$ carrying the clencher flange 9$^a$ is secured by rivets 16 to an inwardly projecting annular flange 17 on the removable ring 6$^a$, and the metal band 5$^a$ is complementary shaped, and one set of the double cone faces 11$^a$, 12$^a$ and 13$^a$, 14$^a$ are located at the median line of the split rim 3$^a$ 3$^b$. In this modification also, the lower set of double cone faces 11$^a$ and 12$^a$ on the metal band 5$^a$ are of the external or rib form instead of the internal, V or groove form.

As in this improvement, the interengaging double cone faces on the metal band and removable ring neutralize each other, the clamping or forcing of the metal band and removable ring together by the clamp bolts, as the ends thereof are screwed home, exerts no outward strain or bursting pressure either upon the tire seating rim or upon the metal band or removable ring.

It will be noted that the method of interengaging the movable ring and the metal band 5 by circular wedge projections and grooves, is one which insures these parts being always concentric with each other without depending upon the bolts for such centering, and also produces an exceedingly rigid and strong connection not liable to shift under blows and shocks such as vehicle wheels are constantly subjected to.

The continuous circular wedge and groove joint between the clamped together metal band and removable rim, is one through which no dirt or sand can penetrate to the tire seat from the inner direction, and since the seat is solid on the other side and since the curved flanges protect the tire seat from the outer direction, the tire seat is perfectly dirt and sand proof from all sides, a thing which largely lengthens the service of the tire.

What is claimed is:

1. In a resilient tired wheel, the combination with a metal band on the wheel, of a tire seating rim having a tire engaging flange thereon at one side, and a removable ring having an opposing tire engaging flange, said metal band and removable ring having two sets of interengaging double cone or wedge faces, and connecting means for clamping together said metal band and said removable ring, substantially as specified.

2. In a resilient tired wheel, the combination with a metal band on the wheel, of a tire seating rim having a tire engaging flange thereon at one side, and a removable ring having an opposing tire engaging flange and clamp bolts extending through said metal band and removable ring, said metal band and removable ring having two sets of interengaging double coné or wedge faces, one set of said interengaging double cone faces being circumferentially inside and the other set circumferentially outside said clamping bolts, substantially as specified.

JOHN G. HODGSON.

Witnesses:
PEARL ABRAMS,
WILLIAM A. GEIGER.

---

Copies of this patent may be obtained for five cents each, by addressing the "Commissioner of Patents, Washington, D. C."